United States Patent [19]

Smith et al.

[11] 3,989,400
[45] Nov. 2, 1976

[54] PULLING EYE

[75] Inventors: Jackson A. Smith, Bradner; Edgar D. Perusse, Aldergrove, both of Canada

[73] Assignees: Rank Industries Ltd.; Perusse Holdings Ltd., both of Canada

[22] Filed: July 21, 1975

[21] Appl. No.: 597,930

[52] U.S. Cl................................ 403/275; 403/284; 174/79; 339/100; 339/276 D; 29/508; 29/517
[51] Int. Cl.[2]......................................... F16G 11/05
[58] Field of Search ........... 403/275, 274, 284, 285, 403/271, 277, 36; 174/79; 339/100, 276 R, 276 D, 276 T; 29/508, 517, 518

[56] References Cited
UNITED STATES PATENTS

| | | | |
|---|---|---|---|
| 1,257,981 | 3/1918 | Cole | 403/275 |
| 1,733,279 | 10/1929 | Shults | 403/284 |
| 2,327,831 | 8/1943 | Sutton | 403/275 |
| 3,909,048 | 9/1975 | Townsend | 403/284 X |
| 3,909,886 | 10/1975 | Hocke | 403/274 X |

Primary Examiner—Wayne L. Shedd
Attorney, Agent, or Firm—Cushman, Darby & Cushman

[57] ABSTRACT

A pulling eye assembly is adapted for attachment to the end of a communication cable whereby linear pull can be applied to the cable end to draw the cable into place in the air on poles or underground through conduit. The outer portion or sleeve of the assembly may also be used for pressurizing air or gas filled cables to exclude moisture.

3 Claims, 5 Drawing Figures

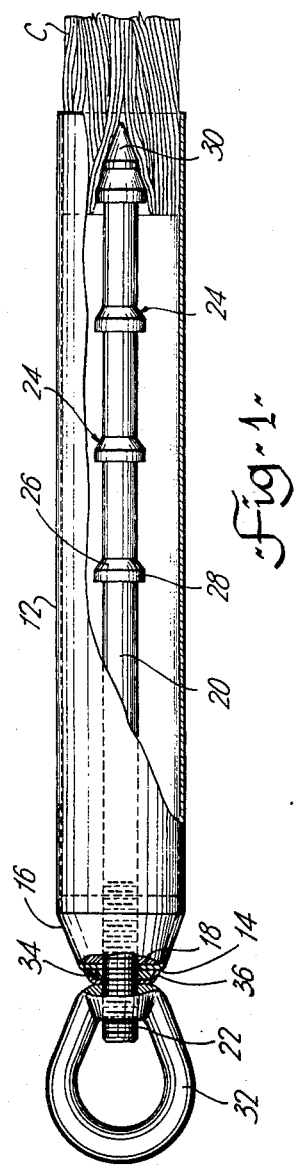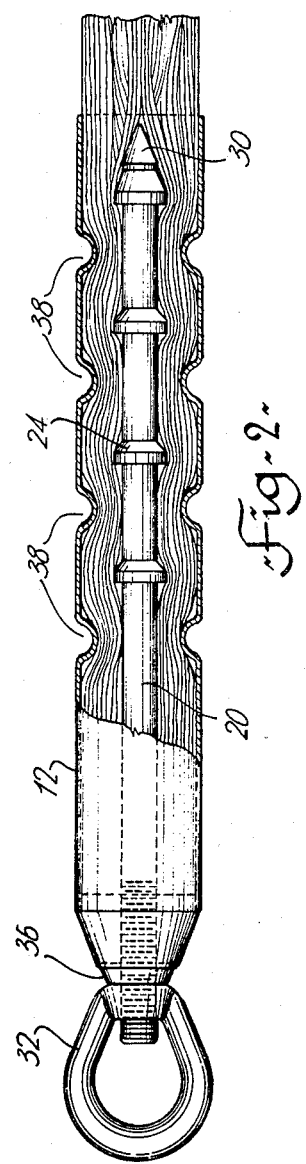

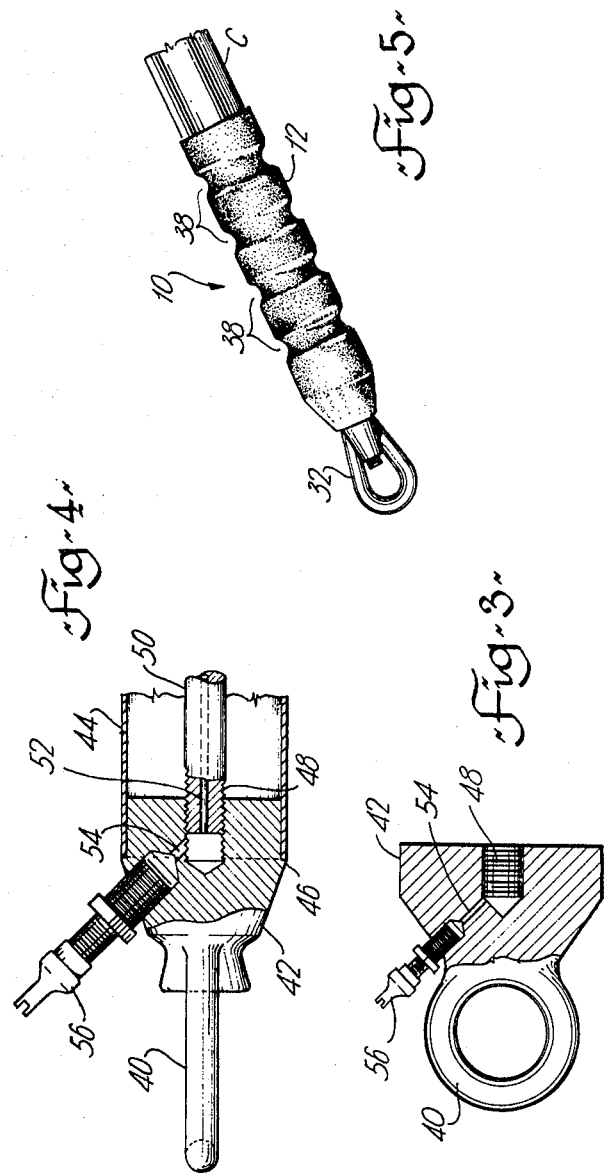

PULLING EYE

This invention relates to means for engaging and pulling the large end of communication cable and in particular to a pulling eye assembly which can be quickly attached to the end of a communication cable, secured thereon and then used for linearly pulling the cable either underground or in the air over poles.

Cable connecting devices are known but those which are available are not altogether satisfactory for the above-mentioned functions. One example is to be found in the U.S. Pat. No. 3,522,961, to Cave.

The purpose of the present invention is to provide a cable pulling eye which is relatively inexpensive to produce, easy to apply to the end of the cable, and of extreme strength relative to the cable end whereby it can be sujected to quite high linear loads. The use of the present invention results in the saving of numerous splices in communication cable by virtue of the fact that it can pull longer and heavier loads of cable and it therefore is a provision for further saving in time, labour and reel handling. The invention also makes provision for pressurizing and sealing cable ends in particular for underground conduit work.

In accordance with a broad aspect, the present invention relates to a pulling eye assembly for attachment to a terminal end of a communication cable. The assembly consists of an elongated metal sleeve open at one end to accommodate the cable and closed at its other end. A block member is mounted in the closed ends of the sleeve and a spigot which has a plurality of barbs spaced throughout its length, is secured to the block and positioned concentrically within the sleeve. A pulling eye is interconnected with the spigot and positioned outwardly of the closed end of the sleeve, the latter being adapted to be circumferentially crimped between the barbs on the spigot when the latter has been driven into the end of the cable whereby the cable is positioned annularly between the spigot and the walls of the sleeve.

The invention is illustrated by way of example in the accompanying drawings in which:

FIG. 1 is an elevational view in section of the pulling eye assembly;

FIG. 2 is a view similar to FIG. 1 but illustrating the sleeve after it has been crimped between the barbs of the spigot;

FIG. 3 is an elevational view, partly in section, of another embodiment of a pulling eye;

FIG. 4 is a sectional view of a pulling eye shown in FIG. 3 as attached to a sleeve member; and FIG. 5 is an elevational view of the pulling eye of FIG. 1 attached to a communication cable and in readiness for linear towing.

Referring first to FIG. 1, the assembly shown generally at 10 comprises a sleeve 12 preferably, though not necessarily, formed of light wall steel tubing of constant diameter and of sufficient length to provide the desired engagement with the cable end. As an example, a sleeve having an inside diameter of approximately 1 ⅜ inches would have the length of between 8 and 10 inches. An shown in FIG. 1, one end of the sleeve is open to receive an end of communication cable and the other end 14 of the sleeve is closed. The diameter of the closed end of the sleeve may be the same as the remainder thereof but preferably the closed end is tapered as at 16 and a metal block 18 is mounted in the closed end of sleeve 12 as shown. The block 18 is drilled and tapped to threadably receive one end of a metal rod or spigot 20, one end of which is threaded at 22 for engagement with the block and for extension outwardly of the closed end as illustrated. The spigot 20 is concentrically positioned within the interior of the sleeve and extends substantially the whole length of the interior thereof. The spigot 20 as shown in FIG. 1 is provided throughout its length with a plurality of barbs 24 which can either be integral with the spigot or secured thereto by welding or the like. It will be observed that the barbs 24 have tapered faces 26 facing the direction of the cable end and planar faces 28 in the direction of pull. The terminal end of the spigot 20, remote from the closed end of the sleeve, is provided with a sharp tapered nose 30.

The other end of the spigot 20 which extends through the closed end of the sleeve and the blocking pin is provided with a pulling eye 32 of suitable configuration, eye 32 being threadably engaged with the end of the spigot 20 and, if desired, the threaded opening in the block 18 can be sealed between the closed end of the sleeve 12 and the eye 32 by means of a silicone rubber paste 34 and a washer 36 or the equivalent thereof. Alternately, the space between the eye 32 on the closed end of the sleeve 12 can be accommodated by a lock nut, not shown.

As shown in FIG. 1, the terminal end 30 of the spigot 20 is being driven into the end of a communication cable. It is worth noting that no wires are removed from the center of the cable but they are merely displaced by the terminal end of the rod. After the sleeve and rod are driven fully onto the end of the cable so that the latter engages the face of the block 18 as in FIG. 2, the sleeve 12 is then circumferentially crimped as at 38 in FIG. 2 between the block and first barb and between all other barbs throughout the length of the assembly. This crimping compresses the sheath of cable C, with conductors and insulation over the spigot 20 causing deformation of the messenger wires. The depth of the crimp is determined by the total area of the end section of wires in the messenger wires so that compression of the wires is taken to a point where theoretically they are solid copper whereby attaining nearly the tensile strength of the copper itself which of course would have to be overcome before the complete eye assembly 10 will part from the communication cable C.

Referring to FIGS. 3 and 4, a preferred form of pulling eye is shown wherein the eye 40 is integrally formed with the block 42. In this embodiment, the sleeve 44 is welded to the block 42 such as at an angular shoulder 46 so that the block 42 constitutes the closed end of the tubes. It will be observed that the block 42 is concentrically drilled at 48 and tapped to receive the threads of a spigot 50 and the latter is provided with an air passage 52 throughout its length which is adapted to cooperate with an air passage 54 in block 42, passage 54 being provided with a suitable valve 56 as illustrated. The air valve and passage illustrated in FIGS. 3 and 4 are also of course applicable to the embodiment shown in FIGS. 1 and 2.

It is often desirable to pressurize the end of the cable so that it will not collapse and to maintain the wires on the inside in a uniform state. Pressurization also maintains the end of the cable free from moisture, an important factor if the cable is being drawn below a water line in an underground operation. It will be appreciated that pressurization takes place by putting air in through the valve 56 which extends throughout the length of the spigot and then through the end of the cable.

In its finished form, the assembly 10 is shown in FIG. 5 (the FIG. 1 embodiment) being attached to the Cable C and is ready for linear towing.

While the present invention has been described in connection with specific embodiments thereof and its specific uses, various modifications thereof will occur to those skilled without departing from the spirit and scope of the invention as set forth in the claims of this application. Terms and expressions which have been employed in the disclosure are used as terms of description and not of limitation and there is no intention in the use of such terms and expressions to exclude any equivalents of the features shown and described or portions thereof, but it is recognized that various modifications are possible within the scope of the invention as claimed.

The embodiments of the invention in which an exclusive property or privilege is claimed are defined as follows:

1. A pulling eye assembly for attachment to a terminal end of a communication cable, said assembly comprising an elongated metal sleeve open at one end to accommodate said cable and closed at the other end; a block member welded in and constituting the closed end of the sleeve; a spigot, having a plurality of barbs spaced throughout its length, secured to said block and positioned concentrically within said sleeve; and a pulling eye interconnected with said spigot and positioned outwardly of the closed end of the sleeve, the said sleeve being adapted to be circumferentially crimped between said barbs when the spigot has been driven into the end of said cable, said block being concentrically drilled and threaded to threadably receive one end of said spigot.

2. The assembly of claim 1 wherein the block is integral with the pulling eye.

3. The assembly of claim 1 including an air passage through said spigot and a valve on the closed end of the sleeve and connected to said passage whereby the interior of said cable can be pressurized.

* * * * *

UNITED STATES PATENT OFFICE
CERTIFICATE OF CORRECTION

Patent No. 3,989,400          Dated November 2, 1976

Inventor(s) Jackson A. SMITH, ET AL

It is certified that error appears in the above-identified patent and that said Letters Patent are hereby corrected as shown below:

In the front page format, the heading [73] should read as follows:

-- [73] Assignees: Rand Industries Ltd.;
                           Perusse Holdings Ltd.,
                           both of Canada --

Signed and Sealed this

Twenty-eighth Day of December 1976

[SEAL]

*Attest:*

RUTH C. MASON  
*Attesting Officer*

C. MARSHALL DANN  
*Commissioner of Patents and Trademarks*